UNITED STATES PATENT OFFICE.

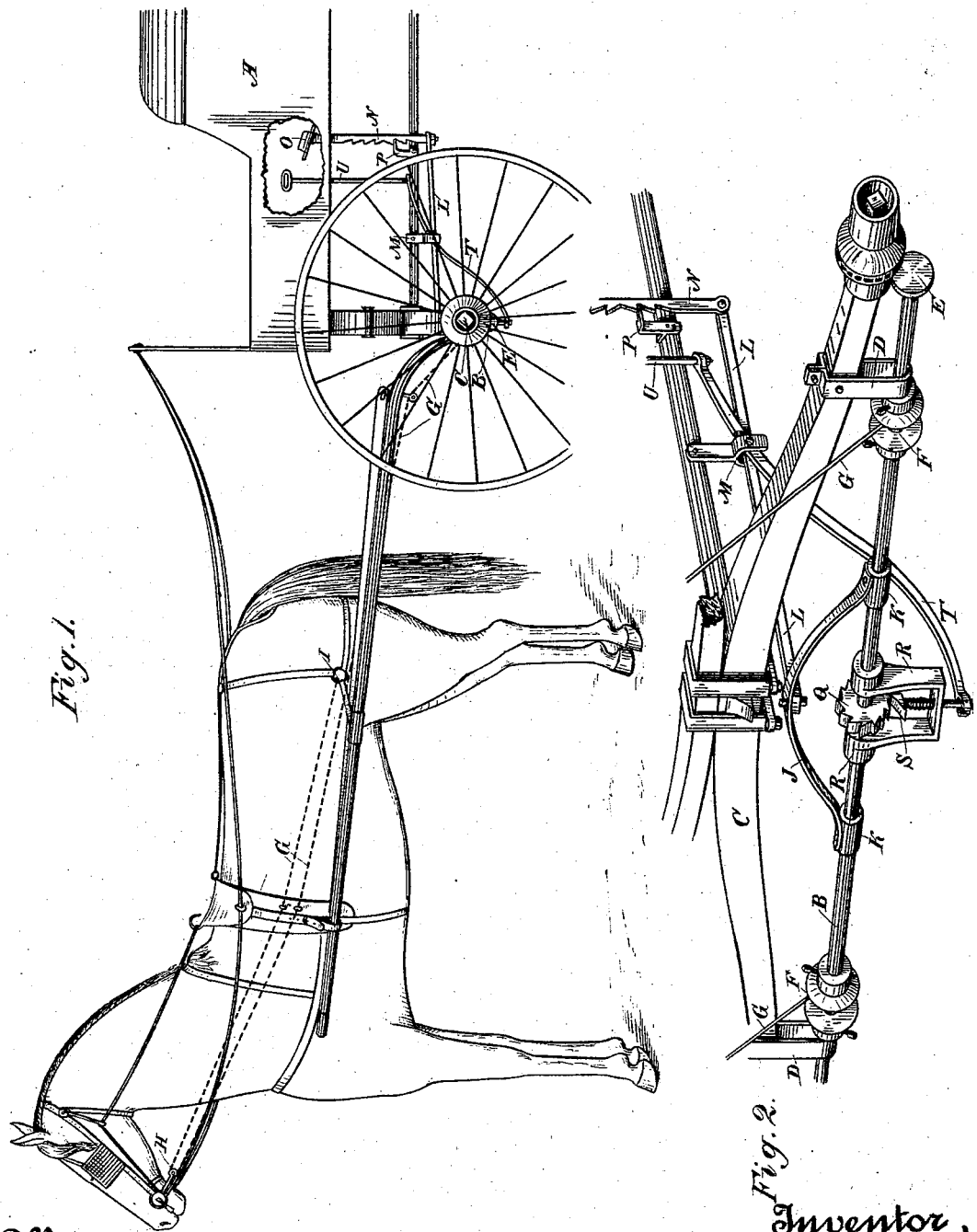

CHARLES F. SHORE, OF SACRAMENTO, CALIFORNIA.

HORSE-HOLDING DEVICE.

SPECIFICATION forming part of Letters Patent No. 369,082, dated August 30, 1887.

Application filed April 13, 1887. Serial No. 234,700. (No model.)

*To all whom it may concern:*

Be it known that I, CHARLES F. SHORE, of Sacramento, Sacramento county, State of California, have invented an Improvement in Horse-Holding Devices; and I hereby declare the following to be a full, clear, and exact description of the same.

My invention relates to a device for holding horses attached to vehicles whenever they become unruly or difficult to manage.

It consists of a shaft extending horizontally beneath the forward axle of the vehicle, having fixed rollers upon the end, which may be raised into contact with the wheel-hubs, thus causing the shaft to rotate, and lines having one end connected with the shaft, so as to be wound upon it when rotated, while the other ends are connected with the bit, so as to pull upon the horse, if desired, and, in combination with these, of a mechanism by which they are easily operated.

Referring to the accompanying drawings for a more complete explanation of my invention, Figure 1 represents a side elevation of a portion of a vehicle having my improvements applied thereto and showing an animal connected therewith. Fig. 2 is an enlarged detail view in perspective of the front axle of the vehicle with the improvement attached.

A is a buggy or vehicle, having a shaft, B, extending horizontally beneath the forward axle, C, the shaft passing through slotted hangers D, in which it turns freely, and in which it may also have a vertical movement.

E E are rollers having rubber or other suitable frictional faces. These rollers are secured to the ends of the shaft B, and ordinarily stand beneath the inner ends of the front wheel-hubs, so that if the shaft be raised upward these rollers will come in contact with the bands of the inner ends of the hubs, and the friction between the parts will cause the rollers and shaft to be rotated by the movement of the wheel-hubs.

Upon the shaft are fixed two or more rollers or drums, F, around which the ends of the lines G may be caused to wind by the rotation of the shaft. These lines extend forward and pass through pulleys or rings H, attached to the bit of the horse upon either side, and thence leading backward they may be attached to the breeching, as shown at I. It will be manifest that when the shaft B is caused to rotate and the lines are wound upon it they will be shortened, and thus, acting through the pulley H upon the horse's mouth or the bit, will pull him back and control his action. In order to raise or lower the shaft B at will, it has an arched piece, J, near the center, with journals K, through which the shaft passes and within which it turns freely.

A lever, L, has one end attached to or connected with the center of the arched piece J, and it is fulcrumed in a hanger or support, M, secured beneath the bottom of the vehicle. The long arm of the lever, which is preferably situated under or near the seat, is connected with a vertical rack, N, which extends upward into the vehicle, and has a foot-piece, O, by which it may be depressed, thus acting through the lever L to raise the shaft B and bring the friction-rollers into contact with the hub-bands of the forward wheels. This rack N may be held so as to retain the parts in position by means of a pawl, P. When it is desired to release the device and allow the shaft B to drop, so as to take the rollers E out of contact and prevent the lines being wound up any further, it can be done by releasing the pawl P, which will allow the parts to remain in their normal position. If, however, it is found desirable to wind the lines up to a certain point and then hold them without winding any further, it may be done by means of a ratchet-wheel, Q, which is shown in the present case situated centrally upon the shaft B and having a fork or guide, R, depending upon each side of it from the shaft B. Through the bottom of this bar the shank of a pawl, S, passes, and a spring acts to throw this pawl into contact with the ratchet-wheel Q, so that after the lines have been drawn back as far as desired by the rotation of the shaft B the shaft may be stopped so as not to turn any more; but whatever amount has been wound up on the shaft will be retained by means of the pawl S and the ratchet-wheel Q.

When it is desired to release the shaft B, to allow the lines to again unwind, it is done by means of a lever, T, fulcrumed in the hanger M from the vehicle, having one end connected with the pawl S and the other connected with a rod or actuating-handle, U, within reach of the driver.

By this construction the hardest-mouthed or most fractious horse can be easily controlled by winding upon the check-lines. In case of a tendency to run away a certain tension may be put upon these lines, so that the horse can be managed with the ordinary reins with very little difficulty.

Having thus described my invention, what I claim as new, and desire to secure by Letters Patent, is—

1. The horizontal shaft journaled in slotted hangers or guides and having a vertical movement therein, frictional rollers upon the ends of the shaft in line with the hubs of the vehicle-wheels, and a lever whereby the shaft and friction-rollers may be vertically raised or depressed, in combination with supplemental lines having one end connected with the shaft, so as to be wound thereon, and the other connected with the bit in the horse's mouth, substantially as herein described.

2. The vertically-moving supplemental shaft journaled below the vehicle-axle and having frictional rollers at its ends in line with the vehicle-wheel hubs, in combination with a hanger or yoke through which the center of the shaft passes, a lever fulcrumed to the vehicle, having one end connected with this yoke and the other extending backward, with an operating arm or foot-piece and a pawl and rack, substantially as herein described.

3. The supplemental vertically-movable shaft journaled in hangers beneath the vehicle-axle, having the frictional rollers upon its ends, and the lever or mechanism by which it may be raised so as to bring the rollers into contact with the vehicle-hubs to rotate the shaft and wind up the check-lines connected with the horse's bit, in combination with a ratchet and pawl, by which the shaft may be held at any point when sufficient tension is brought upon the lines, substantially as herein described.

4. The vertically-movable shaft journaled beneath the vehicle-axle, having frictional rollers upon its ends, and means for raising and depressing the shaft so as to wind up the supplemental check-lines connected with the horse's bit, and a pawl and ratchet-wheel for holding the shaft at any desired point, in combination with a lever connected with said pawl, whereby it may be released and the shaft allowed to turn backward to relieve the check-lines, substantially as herein described.

In witness whereof I have hereunto set my hand.

CHARLES F. SHORE.

Witnesses:
S. H. NOURSE,
H. C. LEE.